United States Patent [19]

Kohyama et al.

[11] Patent Number: 4,801,672

[45] Date of Patent: Jan. 31, 1989

[54] RANDOM 1-BUTENE COPOLYMER

[75] Inventors: Masaki Kohyama, Ichihara; Takeshi Muranaka, Iwakuni; Kunisuke Fukui, Ohno; Norio Kashiwa, Iwakuni, all of Japan

[73] Assignee: Mitsui Petrochemical Industries, Ltd., Tokyo, Japan

[21] Appl. No.: 792,596

[22] Filed: Oct. 29, 1985

[30] Foreign Application Priority Data

Nov. 1, 1984 [JP] Japan .............................. 59-238951

[51] Int. Cl.$^4$ ............................................. C08F 210/14
[52] U.S. Cl. ................................. 526/348.2; 502/125; 526/348.3; 526/348.4; 526/348.5; 526/348.6; 526/125
[58] Field of Search ............... 526/348.2, 348.3, 348.4, 526/348.5, 348.6

[56] References Cited

U.S. PATENT DOCUMENTS

| | | | |
|---|---|---|---|
| 3,296,232 | 1/1967 | Cleary | 526/348.5 |
| 3,316,226 | 4/1967 | Clark | 526/348.6 |
| 3,489,732 | 1/1970 | Eichembaum | 526/348.3 |
| 3,542,717 | 11/1970 | Lipman | 526/348.3 |
| 3,699,090 | 10/1972 | Nagel | 526/348.4 |
| 4,212,961 | 7/1980 | Kobayashi et al. | 526/151 |
| 4,239,871 | 12/1980 | Fukui | 526/348.6 |
| 4,384,089 | 5/1983 | Dehm | 526/348.3 |
| 4,503,203 | 3/1985 | Golembeski et al. | 526/348.6 |
| 4,527,581 | 7/1985 | Motier | 526/348.2 |
| 4,600,762 | 7/1986 | Fukui et al. | 526/125 |
| 4,642,269 | 2/1987 | Kohyama et al. | 428/516 |

FOREIGN PATENT DOCUMENTS

| | | | |
|---|---|---|---|
| 58-32611 | 2/1983 | Japan | 526/348.2 |
| 2111066 | 6/1983 | United Kingdom | 526/125 |

*Primary Examiner*—Edward J. Smith
*Attorney, Agent, or Firm*—Sherman and Shalloway

[57] ABSTRACT

A random 1-butene copolymer comprising 1-butene and an alpha-olefin having 5 to 20 carbon atoms, said copolymer having the following characteristics (A) to (I):

(A) it comprises 50 to 99 mole % of the 1-butene component and 1 to 50 mole % of the alpha-olefin component, (B) it has an intrinsic viscosity $[\eta]$, measured in decalin at 135° C., of from 0.5 to 6 dl/g, (C) it has a melting point [Tm], measured by a differential scanning calorimeter, of from 30° to 120°0 C., (D) it has a crystallinity, measured by X-ray diffractometry, of from 5 to 60%, (E) the amount [$W_1$ in % by weight] of that portion of it which is soluble in boiling methyl acetate is not more than 2%, and (F) the amount [$W_2$ in % by weight] of that portion of it which is soluble in a 1:1 by volume mixture of acetone and n-decane at 10° C. is less than $5 \times [\eta]^{-1.2}$.

14 Claims, No Drawings

RANDOM 1-BUTENE COPOLYMER

BACKGROUND OF THE INVENTION

1. Field of the Invention

This invention relates to a novel random 1-butene copolymer having excellent utility. More specifically, it relates to a 1-butene random copolymer having excellent transparency, surface non-tackiness, tensile properties and other properties, which is suitable for the production of packaging films or sheets or other melt-molded articles having excellent transparency, anti-blocking property, etc.

2. Description of the Prior Art

Heretofore, vinyl chloride resins have predominantly been used in the field of molding flexible or semirigid resins, but because of the evolution of corrosive gases during their incineration after discharging and the suspected safety of residual monomers or plasticizers therein, it has been desired to replace them by olefinic flexible or semirigid resins.

Olefinic copolymers such as ethylene copolymers, propylene copolymers, and 1-butene copolymers have recently been utilized in the field of molding such flexible or semirigid resins. Many proposals have been made on flexible 1-butene random copolymers composed of 1-butene as a main component and propylene. U. S. Pat. Nos. 3,278,504, 3,332,921 and 4,168,361, British Pat. Nos. 1,018,341 and 1,084,953 and Japanese Laid-Open Patent Publication No. 38787/1975 (corresponding to U.S. Pat. No. 3,923,758) disclose 1-butene random copolymers produced by using titanium trichloride or titanium tetrachloride catalysts.

The above-cited U.S. Pat. No. 3,278,504 describes that a propylene/1-butene copolymer having a 1-butene content of 30 to 70 mole % is produced by using titanium tetrachloride or titanium trichloride. The present inventors have found, however, that the copolymer produced with such a catalyst system is a flexible resin which has a boiling methyl acetate-soluble content of more than 2% by weight and a high acetone/n-decane mixture (1:1 by volume)-soluble content, surface tackiness, and inferior transparency.

The above-cited U.S. Pat. No. 3,332,921 and British Pat. No. 1,084,953 propose various 1-butene copolymers having varying 1-butene contents which are produced by using a titanium trichloride catalyst. The present inventors, however, have found that among these 1-butene copolymers, those having a 1-butene content of 60 to 99 mole % have the same disadvantages as the 1-butene copolymer described in the above-cited U.S. Pat. No. 3,278,504.

In the above-cited British Pat. No. 1,018,341, copolymers having a 1-butene content of 25 to 90 mole % are prepared by using a catalyst comprising a transition metal halide such as titanium trichloride and a derivative of phosphoric acid. The present inventors, however, have found that among the copolymers specifically disclosed in this British Patent, those having a 1-butene content of 50 to 90 mole % have an acetone-soluble content of at least 1.5% by weight. Investigations of the present inventors have shown that these copolymers have a boiling methyl acetate-soluble content of more than 2% by weight and an acetone/n-decane mixed solvent (1:1 by volume)-soluble content of more than $533[\eta]^{-1.2}$ and that these 1-butene copolymers give molded articles having high surface tackiness and inferior transparency.

The above-cited U.S. Pat. No. 4,168,361 discloses propylene/1-butene copolymers having a propylene content of 40 to 90 mole %. Investigations of the present inventors, however, have shown that among these copolymers, those having a 1-butene content of 50 to 60 mole % have a high acetone/n-decane mixed solvent-soluble content, and only give molded articles having high surface tackiness and inferior transparency.

The above-cited Japanese Laid-Open Patent Publication No. 38787/1975 proposes a process for producing an amorphous random 1-butene/propylene copolymer by performing polymerization at high temperatures using a titanium trichloride-type catalyst. The present inventors, however, have found that these copolymers have a methyl acetate-soluble content of more than 2% by weight, and inferior tensile properties.

Japanese Laid-Open Patent Publication No. 85293/1979 describes a random 1-butene/propylene copolymer containing 1-butene as a main component which has a narrow composition distribution, a low boiling methyl acetate-soluble content and low surface tackiness. The content of low-molecular-weight components in this 1-butene/propylene copolymer, particularly the content of a low-molecular-weight polymer represented by the boiling methyl acetate-soluble content, and the surface tackiness of a molded article prepared from this copolymer are considerably improved over those of 1-butene copolymer obtained by a catalyst system comprising titanium trichloride or titanium tetrachloride. The present inventors, however, have found that the content of the low-molecular-weight polymer in the 1-butene random copolymer, especially the content of the low-molecular-weight polymer represented by the acetone/n-decane mixed solvent (1:1 by volume)-soluble content, is still high, and that a molded article, such as a film, of a resin composition obtained by incorporating the above random 1-butene/propylene copolymer in a polypropylene resin for improved impact strength, tends to increase in surface tackiness with time, and is still unsatisfactory in applications which require high levels of transparency and surface non-tackiness.

SUMMARY OF THE INVENTION

The present inventors recognized that conventional random 1-butene type copolymers have a high low-molecular-weight polymer content and molded articles obtained from these copolymers have inferior surface non-tackiness, transparency and dynamical properties such as rigidity. On the basis of this recognition, the present inventors have conducted a research and development work in order to provide a random 1-butene copolymer improved in these properties over the conventional random 1-butene copolymer.

Consequently, the present inventors succeeded in synthesizing a novel random 1-butene copolymer composed of 1-butene as a main component and an alpha-olefin having 2 to 20 carbon atoms and having the characteristic values (A) to (I) defined below.

It has also been found that this novel 1-butene random copolymer has a low content of a low-molecular-weight polymer component, particularly that represented by both its boiling methyl acetate-soluble content and an acetone/n-decane mixed solvent (1:1 by volume)-soluble content, and that a molded article obtained from this random 1-butene copolymer is particularly superior in surface non-tackiness, transparency and dynamical properties such as rigidity.

It is an object of this invention to provide a novel random 1-butene copolymer composed of a major proportion of 1-butene and a minor proportion of an alpha-olefin having 5 to 20 carbon atoms.

According to this invention, there is provided a random 1-butene copolymer composed of 1-butene and an alpha-olefin having 5 to 20 carbon atoms, said random 1-butene copolymer being characterized by the following characteristics (A) to (F), (A) it comprises 50 to 99 mole % of 1-butene component and 1 to 50 mole % of the alpha-olefin component, (B) it has an intrinsic viscosity $[\eta]$, measured in decalin at 135° C., of from 0.5 to 6 dl/g, (C) it has a melting point [Tm], measured by a differential scanning calorimeter, of from 30° to 120° C., (D) it has a crystallinity, measured by X-ray diffractometry, of from 5 to 60%, (E) the amount [$W_1$ in % by weight] of that portion of it which is soluble in boiling methyl acetate is not more than 2%, and (F) the amount [$W_2$ in % by weight of that portion of it which is soluble in a 1:1 by volume mixture of acetone and n-decane at 10° C. is less than $5 \times [\eta]^{-1.2}$.

DETAILED DESCRIPTION OF THE INVENTION

In the random 1-butene copolymer of this invention, the composition (A) of the copolymer is such that the proportion of the 1-butene component is in the range of 50 to 99 mole %, preferably 60 to 98 mole %, more preferably 70 to 98 mole %, and the proportion of the alpha-olefin component having 5 to 20 carbon atoms is in the range of 1 to 50 mole %, preferably 2 to 40 mole %, more preferably 2 to 30 mole %. If the content of the 1-butene component in the copolymer is less than 50 mole %, the surface non-tackiness and tensile properites of the copolymer are reduced. If it exceeds 99 mole %, the transparency of the copolymer is reduced. Examples of the alpha-olefin component having 5 to 20 carbon atoms include 1-pentene, 1-hexene, 4-methyl-1-pentene, 3-methyl-1-pentene, 1-octene, 1-decene, 1-dodecene, 1-tetradecene, 1-hexadecene, 1-octadecene and 1-eicosene.

In the present invention, the 1-butene content of the copolymer is measured by $^{13}$C-NMR.

The random 1-butene copolymer of this invention has an intrinsic viscosity $[\eta]$ (B), determined in decalin at 135° C., of 0.5 to 6 dl/g, preferably 1 to 5 dl/g, especially preferably 1.5 to 3.5 dl/g. The intrinsic viscosity is a measure of the molecular weight of the copolymer of the invention.

The melting point (C), measured by a differential scanning calorimeter, of the copolymer of this invention (to be sometimes abbreviated as the DSC melting point) is 30° to 120° C., preferably 40° to 115° C. The DSC melting point in the above specific range, in combination with the other characteristic values, serves to provide the copolymer having the aforesaid excellent properties.

The DSC melting point is measured as follows: A 0.1 mm-thick press sheet taken 20 hours after its molding is subjected to differential scanning calorimetry at a temperature raising rate of 10° C./min. over a range of 0° to 200° C., and the maximum endothermic peak is determined and defined as Tm.

The crytallinity (D) of the 1-butene random copolymer measured by X-ray diffractometry is in the range of 5 to 60%, preferably 10 to 55%. This characteristic value is a measure of the excellency of the tensile properties of the copolymer of the invention, and in combination with the other characteristic values, serves to provide the random copolymer having the aforesaid excellent properties. The crystallinity is determined by X-ray diffractometry using a 1.5 mm thick press sheet taken 20 hours after its molding.

The amount [$W_1$ in % by weight] (E) of that portion of the 1-butene random copolymer soluble in boiling methyl acetate is not more than 2% by weight, for example 0.01 to 2% by weight, preferably 0.02 to 1% by weight. The amount [$W_1$] is preferably within the range represented by the following formulae.

$$0.01 \leq W_1 \leq 0.02a + 1.0$$

more preferably $0.02 \leq W_1 \leq 0.015a + 0.7$ especially preferably $0.03 \leq W_1 \leq 0.01a + 0.5$ In the above formulae a represents the content in mole % of the alpha-olefin component in the 1-butene copolymer.

This characteristic value represents the content of a low-molecular-weight polymer component in the random 1-butene copolymer of this invention, and is a measure of the breadths of the composition distribution and molecular weight distribution of the copolymer. In combination with the other characteristic values, it serves to provide the copolymer having the aforesaid excellent properties. The [$W_1$] is measured by the following method.

A polymer sample having a size of about 1 mm × 1 mm × 1 mm is put in a cylindrical glass filter, and extracted for 7 hours by a Soxhlet extractor at a reflux frequency of about 1 per 5 minutes. The extraction residue is dried in a vacuum dryer (degree of vacuum less than 10 mmHg) and its weight is measured. The weight of that portion which dissolves in boiling methyl acetate is determined from a weight difference from the original sample. [$W_1$] is the percentage of the weight of the boiling methyl acetate-soluble portion based on the weight of the original sample.

The amount [$W_2$ in % by weight] (F) of that portion of the 1-butene type copolymer which dissolves at 10° C. in a mixture of acetone and n-decane is less than $5 \times [\eta]^{-1.2}$ % by weight, for example, $0.1 \times [\eta]^{-1.2}$ to $4 \times [\eta]^{-1.2}$% by weight, especially preferably $0.3 \times [\eta]^{-1.2}$ to $3 \times [\eta]^{-1.2}$% by weight based on the weight of the copolymer. $[\eta]$ used herein means the intrinsic viscosity value of the copolymer. This characteristic value represents the content of a low-molecular-weight, polymer component in the random 1-butene copolymer of this invention and is a measure of the breadths of the composition distribution and molecular weight distribution of the copolymer. In combination with the other characteristic values, this characteristic value serves to provide the copolymer having the aforesaid excellent properties. The [$W_2$] value is determined as follows:

One gram of a copolymer sample, 0.05 g of 2,6-di-tert-butyl-4-methylphenol and 50 ml of n-decane are put in a 150 ml flask equipped with stirring vanes and dissolved on an oil bath at 120° C. After the dissolving, the solution is allowed to cool spontaneously at room temperature for 30 minutes. Then, 50 ml of acetone is added over 30 seconds, and the solution is cooled on a water bath at 10° C. for 60 minutes. The precipitated copolymer was separated from the solution containing a low-molecular-weight polymer component by filtration on a glass filter. The solution is dried at 150° C. and 10 mmHg until its weight becomes constant. The weight of the dried product is measured. The amount of the copolymer which dissolved in the mixed solvent is calculated as the percentage of the weight of the original sample copolymer. In the above method, the stirring is continuously effected from the time of dissolution until immediately before the filtration.

Further, the random 1-butene copolymer of this invention preferably has a yield strength (G), measured by the method of JIS K-7113, of 10 to 200 kg/cm$^2$, more preferably 20 to 150 kg/cm$^2$, a tensile strength at break (H), measured by the method of JIS K-7113, of 100 to 1000 kg/cm$^2$, more preferably 120 to 600 kg/cm$^2$, and an elongation at break (I), measured by the method of JIS K-7113, of at least 300%, more preferably 500 to 1500%. The yield strength (G), the tensile strength at break (H) and the elongation at break (I) are measured by the testing methods of JIS K-7113. Specifically, a 1 mm-thick press sheet is molded by the method of JIS K-6758, and 19 hours after the molding, a test sample (No. 2 in accordance with JIS K-7113) is punched out from the press sheet. The above properties of the test sample were measured at a stretching speed of 50 mm/min. in an atmosphere kept at 25° C. 20 hours after the molding of the press sheet. When no clear yield point appears, a stress at 20% elongation is taken as the yield strength.

The random 1-butene copolymer of this invention preferably also satisfies the characteristic values (J) to (L) below.

The random 1-butene copolymer has a torsional rigidity (J), measured by the method of JIS K-6745, of, for example, 100 to 2000 kg/cm$^2$, preferably 150 to 1500 kg/cm$^2$. The torsional rigidity is measured as follows: A 1 mm-thick press sheet is molded in accordance with JIS K6758, and 9 days after the molding, a rectangular test sample, 64 mm long and 635 mm wide, is punched out from the press sheet. Ten days after the molding of the press sheet, a load is applied to the test sample in an atmosphere kept at 25° C. at a torsion angle of 50 to 60 degrees, and 5 seconds later, the rigidity of the sample is measured.

The random 1-butene copolymer has a Young's modulus (K), measured in accordance with the method of JIS K-7113, of, for example, 200 to 4000 kg/cm$^2$, preferably 300 to 3000 kg/cm$^2$. Preferably, the Young's modulus (K) of the 1-butene random copolymer is expressed by the following formula in relation to the alpha-olefin content (b mole %) of the copolymer.

$$3000 - 30b \geq K \geq 1000 - 15b$$

The Young's modulus is measured by the same tensile test as in the testing of (G), (H) and (I).

The standard deviation $\sigma$ (L) of the 1-butene content of the random 1-butene copolymer is usually not more than 0.4a mole %, preferably not more than 0.3a mole % (a represents the C$_5$-C$_{20}$ alpha-olefin content in mole % of the random 1-butene copolymer). The standard deviation $\sigma$ is a measure of the randomness of the 1-butene random copolymer. A copolymer of this invention which may satisfy the characteristic value (L) as well as the characteristic values (A) to (F) shows better properties.

The standard deviation value $\sigma$ of the 1-butene random copolymer of this invention is determined by the following equation based on the composition distribution of the copolymer. The composition distribution of the copolymer is measured by an extraction-type column fractionation method in which p-xylene is used as a solvent and the extraction temperature is changed stepwise from 0° to 130° C. at 5° C. intervals. Extraction at a given temperature is carried out for 4 hours by using 2 liters of p-xylene per 10 g of the copolymer sample.

$$\sigma = \left[ \int_0^{100} (\bar{x} - x)^2 f(x) dx \right]^{\frac{1}{2}}$$

wherein $\bar{x}$ represents the average content in mole % of 1-butene in the copolymer, x represents the 1-butene content (mole %), and $f(x)$ represents the differential weight fraction of a component having the 1-butene content of x (mole %).

The random 1-butene copolymer of this invention is characterized by undergoing little changes in physical properties with time because its crystal type is fixed at II. It is known on the other hand that a homopolymer of 1-butene has three crystal types and crystal transition among them occurs with variations in temperature or time. In particular, since transition from a quasi-stable II-type crystal form to a stable I-type crystal form at room temperature is slow, its molding encounters with various difficulties such as deformation of molded articles, and changes of their properties with time.

The random 1-butene copolymer of this invention may have other minor amounts of alpha-olefins such as ethylene or propylene, copolymerized therewith so long as the additional comonomers do not impair the various properties of the copolymer.

The random 1-butene random copolymer can be prepared, for example, by copolymerizing 1-butene and the C$_5$-C$_{20}$ alpha-olefin at a temperature of about 20° to about 200° C. in the presence of a catalyst prepared, for example, from (a) a highly active titanium catalyst component containing magnesium, tianium, halogen and a diester component as essential ingredients and prepared by reacting a magnesium compound, a titanium compound and a diester and optionally a halogen compound (not always necessary when the magnesium or titanium compound contains a halogen atom), (b) an organoaluminum compound, and (c) an organic silicon compound catalyst component having an Si—O—C bond.

In the production of the 1-butene random copolymer, the catalyst and the polymerization conditions may be selected by preliminary experiments so that it satisfies the characteristics (A) to (F). Since the existence of the novel random 1-butene copolymer having the specific characteristic values not described in the prior literature has been clarified by the present invention, the conditions for producing the random 1-butene copolymer of this invention can be experimentally set easily and properly chosen by using the characteritic values (A) to (I) and the auxiliary characteristic values (J) to (L) as a measure.

The titanium catalyst component (a) is prepared preferably by contacting a magnesium compound (or magnesium metal), a titanium compound and a diester or a diesterforming compound with or without other reagents. The preparation can be effected in the same way as in the preparation of known highly active titanium catalyst components containing magnesium, titanium, halogen and an electron donor as essential ingredients. For example, it can be produced in accordance with the methods disclosed in British patent specifications Nos. 1492618, 1554340 and 1554248, U.S. Pat. Nos. 4,157,435, 4,076,924, 4,085,276, 4,250,285, 4,232,139, 4,143,223, 4,315,874, 4,330,649, 4,401,589 and 4,335,015, and European Patent Specification No. 22675.

Several embodiments of producing the titanium catalyst component (a) will be illustrated below.

(1) A magnesium compound or a complex of a magnesium compound and an electron donor is pre-treated or not-pretreated with an electron donor and/or a reaction aid such as an organoaluminum compound or a halogen-containing silicon compound in the presence or absence of an electron donor or a pulverization aid with or without pulverization. The resulting solid is reacted with a titanium compound which is in the liquid state under the reaction conditions. In the above procedure, the electron donor is used at least once as the electron donor.

(2) A magnesium compound in the liquid state having no reducing ability is reacted with a titanium compound in the liquid state in the presence of an electron donor to precipitate a solid titanium complex.

(3) The product obtained in (2) above is further reacted with a titanium compound.

(4) The product obtained in (1) or (2) is further reacted with a titanium compound and an electron donor.

(5) A magnesium compound or a complex of a magnesium compound and an electron donor is pulverized in the presence of a titanium compound and in the presence or absence of an electron donor and a pulverization aid, and with or without pre-treatment with an electron donor and/or a reaction aid such as an organoaluminum compound or a halogen-containing silicon compound, treated with a halogen, a halogen compound or an aromatic hydrocarbon. In the above procedure, the electron donor is used at least once.

Preferred among these methods are those in which a liquid titanium halide is used, or a halogenated hydrocarbon is used after or during the use of the titanium compound.

The electron donor used in the above methods of preparation is not necessarily limited to the diester or diester-forming compound. There may be used other electron donors such as alcohols, phenols, aldehydes, ketones, ethers, carboxylic acids, carboxylic acid anhydrides, carbonic acid esters, monoesters and amines.

Preferred examples of the diester as an essential component of the highly active solid titanium catalyst component (a) used in the invention include diesters of dicarboxylic acids in which two carboxyl groups are attached to one carbon atom and dicarboxylic acids in which one carboxyl group is attached to each of the two adjoining carbon atoms. Examples of the dicarboxylic acids in such dicarboxylic acid esters are malonic acid, substituted malonic acid, succinic acid, substituted succinic acid, maleic acid, substituted maleic acid, fumaric acid, substituted fumaric acid, alicyclic dicarboxylic acids in which two carboxyl groups are attached to one carbon atom forming the aliphatic ring, alicyclic dicarboxylic acids in which one carboxyl group is bonded to each of the two adjoining carbon atoms forming the aliphatic ring, aromatic dicarboxylic acids having carboxyl groups at the ortho-position, and heterocyclic dicarboxylic acids having one carboxyl group to each of the two adjoining carbon atoms forming the heterocyclic ring.

Specific examples of the dicarboxylic acids exemplified above include malonic acid; substituted malonic acids such as methylmalonic acid, ethylmalonic acid, isopropylmalonic acid, allylmalonic acid, and phenylmalonic acid; succinic acid; substituted succinic acids such as methylsuccinic acid, dimethylsuccinic acid, ethylsuccinic acid, methylethylsuccinic acid and itaconic acid; maleic acid; substituted maleic acids such as citraconic acid and dimethylmaleic acid; alicyclic dicarboxylic acids such as cyclopentane-1,1-dicarboxylic acid, cyclopentane-1,2-dicarboxylic acid, cyclohexane-1,2-dicarboxylic acid, cyclohexene-1,2-dicarboxylic acid, cyclohexene-2,3-dicarboxylic acid, cyclohexene-3,4-dicarboxylic acid, cyclo-hexene-4,5dicarboxylic acid, Nadic Acid, Methylnadic Acid, and 1-allylcyclohexane-3,4-dicarboxylic a acid; aromatic dicarboxylic acids such as phthalic acid, naphthalene-1,2-dicarboxylic acid and naphthalene-2,3-dicarboxylic acid; and heterocyclic dicarboxylic acids such as furane-3,4-dicarboxylic acid, 4,5-dihydrofurane-2,3-dicarboxylic acid, benzopyran-3,4-dicarboxylic acid, pyrrole-2,3-dicarboxylic acid, pyridine-2,3-dicarboxylic acid, thiophene-3,4-dicarboxylic acid, and indole-2,3-dicarboxylic acid.

Preferably, at least one of the alcohol components of the dicarboxylic acid diesters exemplified above has at least 2 carbon atoms, especially at least 3 carbon atoms. It is above all preferred that both of the alcohol components have at least 2 carbon atoms, especially at least 3 carbon atoms. Examples include the diethyl esters, diisopropyl esters, di-n-propyl esters, di-n-butyl esters, diisobutyl esters, di-tert-butyl esters, diisoamyl esters, di-n-hexyl esters, di-2-ethylhexyl esters, di-n-octyl esters, diisodecyl esters, and ethyl n-butyl esters of the above-exemplified dicarboxylic acids.

Both a magnesium compound having reducing ability and a magnesium compound having no reducing ability can be utilized in the preparation of the solid highly active titanium catalyst component (a).

The former includes, for example, magnesium compounds having a magnesium-carbon bond or a magnesium-hydrogen bond, for example dimethyl magnesium, diethyl magnesium, dipropyl magnesium, dibutyl magnesium, ethylbutyl magnesium, diamyl magnesium, dihexyl magnesium, didecyl magnesium, ethylmagnesium chloride, propylmagnesium chloride, butylmagnesium chloride, hexylmagnesium chloride, amylmagnesium chloride; ethyl butylmagnesium and butylmagnesium hydride. These magnesium compounds may be used in the form of a complex with an organoaluminum compound, for example, or may be in the form of a liquid or a solid.

The latter includes, for example, magnesium halides such as magnesium chloride, magnesium bromide, magnesium iodide and magnesium fluoride; alkoxymagnesium halides such as methoxymagnesium chloride, ethoxymagnesium chloride, isopropoxymagnesium chloride, butoxymagnesium chloride and octoxymagnesium chloride; aryloxymagnesium halides such as phenoxy magnesium chloride and methylphenoxymagnesium chloride; alkoxymagnesiums such as ethoxy magnesium, isopropoxy magnesium, butoxy magnesium, n-octoxy magnesium, and 2-ethylhexoxy magnesium; aryloxy magnesiums such as phenoxy magnesium and dimethylphenoxy magnesium; and carboxylic acid salts of magnesium such as magnesium laurate and magnesium stearate. These magnesium compounds having no reducing ability may be derived from the aforesaid magnesium compounds having reducing ability, or those derived during the preparation of the catalyst component. The above magnesium compounds may be a complex with other metals or mixtures of other metal compounds. Or they may be a mixture of two or more of these compounds.

Preferred are the magnesium compounds having no reducing ability, and halogen-containing magnesium compounds, particularly, magnesium chloride, alkoxy magnesium chlorides and aryloxymagnesium chlorides are preferred.

Suitable titanium compounds used to prepare the titanium catalyst component (a) are tetravalent titanium compounds represented by $Ti(OR)_gX_{4-g}$ in which R is a hydrocarbon group, X is halogen and g is 0 to 4.

Specific examples of such titanium compounds include titanium tetrahalides such as $TiCl_4$, $TiBr_4$ and $TiI_4$; alkoxytitanium trihalides such as $Ti(OCH_3)Cl_3$, $Ti(OC_2H_5)Cl_3$, $Ti(O\ n\text{-}C_4H_9)Cl_3$, $Ti(OC_2H_5)Br_3$ and $Ti(O\ iso\text{-}C_4H_9)Br_3$; alkoxytitanium dihalides such as $Ti(OCH_3)_2Cl_2$, $Ti(OCH_2H_5)_2Cl_2$, $Ti(O\ n\text{-}C_4H_9)_2Cl_2$ and $Ti(OC_2H_5)_2Br_2$; trialkoxytitanium monohalides such as $Ti(OCH_3)_3Cl$, $Ti(OC_2H_5)_3Cl$, $Ti(O\ n\text{-}C_4H_9)_3Cl$ and $Ti(OC_2H_5)_3Br$; and tetraalkoxytitaniums such as $Ti(OCH_3)_4$, $Ti(OC_2H_5)_3$ and $Ti(O\ n\text{-}C_4H_9)_4$. Among them, the halogen-containing titanium compounds, particularly titanium tetrahalides, especially preferably titanium tetrachloride, are preferred. These titanium compounds may be used singly or as a mixture. Or they may be used as diluted in hydrocarbons or halogenated hydrocarbons.

In the preparation of the titanium catalyst component (a), the amounts of the titanium compound, the magnesium compound the electron donor to be supported, and the other electron donors such as alcohols, phenols, monocarboxylic acid esters, the silicon compound and the aluminum compound which may used as required differ depending upon the method of preparation and cannot be defined in a general manner. For example, about 0.1 to about 10 moles of the electron donor to be supported and about 0.05 mole to about 1000 moles of the titanium compound may be used per mole of the magnesium compound.

In the present invention, a catalyst composed of the solid highly active titanium catalyst component (a) described above, (b) an organoaluminum compound and (c) an organic silicon compound having an Si—O—C bond is used.

Examples of the organoaluminum compound (a) include (1) organoaluminum compounds at least having an Al—carbon bond in the molecule, for example organoaluminum compounds represented by the general formula $R_m{}^1Al(OR^2)_nH_pX_q$ wherein each of $R^1$ and $R^2$, which may be identical or different, represents a hydrocarbon, for example a $C_1$-$C_{15}$ hydrocarbon group, preferably $C_1$-$C_4$ hydrocarbon group, X represents a halogen atom such as $0 \leqq m \leqq 3$, $0 \leqq n \leqq 3$, $0 \leqq p \leqq 3$, $0 \leqq q \leqq 3$, provided that $m+n+p+q=3$, and (2) complex alkylated products of aluminum and a metal of Group I of the periodic table represented by the following general formula $M^1AlR_4{}^1$ wherein $M^1$ is Li, Na or K, and $R^1$ is as defined above. Examples of the organoaluminum compounds (a) are those of the general formulae $R^1{}_mAl(OR^2)_{3-m}$ wherein $R^1$, $R^2$ and X are as defined above, and m is preferably a number represented by $0 < m < 3$.

$R_m{}^1AlH_{3-m}$ wherein $R_1$ is as defined above, and m is preferably a number represneted by $2 \leqq m < 3$, $R_m{}^1Al(OR^2)_nX_q$ wherein $R^1$, $R^2$ and X are as defined above, $0 < m \leqq 3$, $0 \leqq n < 3$, $0 \leqq q < 3$, $m+n+q=3$.

Examples of the organoaluminum compounds (a) include trialkyl aluminums such as triethyl aluminum and tributyl aluminum; trialkenyl aluminums such as triisoprenyl aluminum; dialkyl aluminum alkoxides such as diethyl aluminum ethoxide and dibutyl aluminum butoxide; partially alkoxylated alkyl aluminums such as alkyl aluminum sesquialkoxides (e.g., ethyl aluminum sesquiethoxide and butylaluminum sesquibutoxide) and partially alkoxylated alkyl aluminums having the average composition represented by $R_{2.5}{}^1Al(OR^2)_{0.5}$; dialkyl aluminum halides such as diethyl aluminum chloride; dibutyl aluminum chloride and diethyl aluminum bromide; alkyl aluminum sesquihalides such as ethyl aluminum sesquichloride, butyl aluminum sesquichloride and ethyl aluminum sesquibromide; partially halogenated alkyl aluminums, for example alkyl aluminum dihalides such as ethyl aluminum dichloride, propyl aluminum dichloride and butyl aluminum dibromide; other partially halogenated alkyl aluminums, for example alkyl aluminum dihydrides such as ethyl aluminum dihydride and propyl aluminum dihydride; and partially alkoxylated and halogenated alkyl aluminums such as ethyl aluminum ethoxychloride, ethyl aluminum butoxy chloride and ethyl aluminum ethoxy bromide.

$LiAl(C_2H_5)_4$ and $LiAl(C_7H_{15})_4$ may be cited as examples of the compounds (b).

There may also be used organic aluminum compounds in which two or more aluminum atoms are bonded through an oxygen or nitrogen atom, which are similar to the compounds (1). Examples are $(C_2H_5)_2AlOAl(C_2H_5)_2$, $(C_4H_9)_2AlOAl(C_4H_9)_2$, and $$(C_2H_5)AlNAl(C_2H_5).$$
$$|$$
$$C_2H_5$$

Of these, the trialkyl aluminums and the alkyl aluminums in which two or more aluminum atoms are bonded are preferred.

Illustrative of the organic silicon compound (c) having an Si—O—C are alkoxysilanes and aryloxysilanes.

For example, there may be cited organic silicon compounds represented by the following general formula $$R_nSi(OR^1)_{4-n}$$

wherein R represents a hydrocarbon group, such as an alkyl, cycloalkyl, aryl, alkenyl, haloalkyl, or aminoalkyl group, or halogen, $R^1$ represents a hydrocarbon group such as an alkyl, cycloalkyl, aryl, alkenyl or alkoxyalkyl group, and n is a number represented by $0 \leq n \leq 3$, and n R groups, or $(4-(n)OR)^1$ groups may be identical or different.

Other examples of the catalyst component (c) include siloxanes having the group $OR^1$ and silyl esters of carboxylic acid. Compounds in which two or more silicon atoms are bonded to each other through an oxygen or nitrogen atom may be cited as still another example. There may also be used the product of reaction of a compound having no Si—O—C bond with a compound having an O—C bond obtained either in advance or in situ. There can be cited the combined use of a halogen-containing silane compound containing no Si—O—C bond or silicon hydride with an alkoxy group-containing aluminum compound, an alkoxy group-containing magnesium compound, a metal alcoholate, an alcohol, a formic acid ester, ethylene oxide, etc. The organic silicon compounds may also include other metals such as aluminum or tin.

Specific examples of preferred organic silicon compounds as component (c) include trimethylmethoxysilane, trimethylethoxysilane, dimethyldimethoxysilane, dimethyldiethoxysilane, diphenyldimethoxysilane, methylphenyldimethoxysilane, diphenyldiethoxysilane, ethyltrimethoxysilane, methyltrimethoxysilane, vinyltrimethoxysilane, phenyltrimethoxysilane, gamma-chloropropyltrimethoxysilane, methyltriethoxysilane, ethyltriethoxysilane, vinyltriethoxysilane, butyltriethoxysilane, phenyltriethoxysilane, gammaaminopropyltriethoxysilane, chlorotriethoxysilane, ethyltriisopropoxysilane, vinyltributoxysilane, ethyl silicate, butyl silicate, trimethylphenoxysilane, methyltriallyloxysilane, vinyltris(beta-methoxyethoxy)silane, vinyltriacetoxysilane, dimethyltetraethoxydisiloxane and phenyldiethoxydiethylaminosilane. Of these, methyltrimethoxysilane, phenyltrimethoxysilane, methyltriethoxysilane, ethyltriethoxysilane, vinyltriethoxysilane, phenyltriethoxysilane, vinyltributoxysilane, ethyl silicate, diphenyldimethoxysilane, diphenyldiethoxysilane and methylphenylmethoxysilane (the compounds of formula $R_n(OR^1)_{4-n}$ given above in which n is preferably 0 (or 1)) are especially preferred.

Copolymerization of 1-butene with the $C_5$-$C_{20}$ alpha-olefin can be carried out either in the liquid phase or in the vapor phase. Preferably, it is carried out in the liquid phase under such conditions that the copolymer dissolves in the liquid phase. When the copolymeriztion is to be carried out in the liquid phase, an inert solvent such as hexane, heptane or kerosene may be used as a reaction medium, but the olefins themselves may be used as the reaction medium. The amount of the catalyst used is such that per liter of the volume of the reaction zone, the proportion of component (a) is about 0.0001 to about 1.0 millimole as titanium atom, the proportion of component (b) is about 1 to about 2000 moles, preferably about 5 to about 500 moles, as the metal atom per mole of the titanium atom in component (a), and the proportion of component (c), as the Si atom in component (c), is about 0.001 to about 10 moles, preferably about 0.01 to about 2 moles, especially preferably about 0.05 to about 1 mole, per mole of the metal atom in component (b).

The catalyst components (a), (b) and (c) may be contacted during or before the polymerization. In contacting them before the copolymerization, only two of them may be selected and contacted. Alternatively, two or three of them are partly taken individually and contacted. The contacting of the components before the copolymerization may be carried out in an inert gas atmosphere or in an olefin atmosphere.

The copolymerization temperature may be properly chosen, and is preferably about 20° to about 200° C., more preferably about 50° to about 180° C. The pressure can also be properly selected, and is from atmospheric pressure to about 100 kg/cm² preferably about 2 to about 50 kg/cm².

To produce a random 1-butene copolymer having a 1-butene content of 99 to 50 mole %, the ratios of 1-butene and the alpha-olefin to be fed may be properly selected depending, for example, upon the polymerization pressure. For example, the mole ratio of 1-butene/alpha-olefin is from about 0.01 to about 100.

The molecular weight may be controlled to some extent by varying such polymerization conditions as the polymerization temperature and the proportions of the catalyst components used. The addition of hydrogen to the polymerization system is most effective.

The random 1-butene copolymer of this invention differs from the conventional random 1-butene copolymers in that it is free from tackiness and has the other various properties described above. The random 1-butene copolymer of the invention can be molded into various articles such as pipes, films, sheets and hollow containers by any desired molding methods such as extrusion, blow molding, injection molding, compression and vacuum forming. Because of its excellent antiblocking property and heat-sealing property, it is especially suitable as a packaging film. Furthermore, because of the aforesaid properties, it can also be used suitably as a protective film for metal.

In molding the copolymer of this invention, it is possible to incorporate various additives such as stabilizers, antioxidants, ultraviolet absorbers, antistatic agents, lubricants, plasticizers, pigments, and inorganic or organic fillers. Examples of such additives include 2,6-di-tert-butyl-p-cresol, tetrakis[methylene-3-(5-di-tert-butyl-4-hydroxphenyl) propionate]methane, 4,4'-butylidenebis(6- tert-butyl-m-cresol), tocopherols, ascorbic acid, dilauryl thiodipropionate, phosphoric acid-type stabilizers, fatty acid monoglyceride, N,N-(bis-2-hydroxyethyl)alkylamines, 2-(2'-hydroxy-3', 5'-di-tert-butylphenyl)-5-chlorobenzotriazole, calcium stearate, magnesium oxide, magnesium hydroxide, alumina, aluminum hydroxide, silica, hydrotalcite, talc, clay, gypsum, glass fibers, titania, calcium carbonate, carbon black, petroleum resins, polybutene, waxes and natural and synthetic rubbers.

The copolymer of this invention may be used as a mixture with another thermoplastic resin. Examples of the other thermoplastic resin are high-density, medium-density or low-density polyethylene, polypropylene, poly-1-butene, poly-4-methyl-1-pentene, ethylene/vinyl acetate copolymer, Sarlyn A, ethylene/vinyl alcohol copolymer, polystyrene, and maleic anhydride-grafted products of these resins.

The following examples illustrate the random 1-butene copolymer of this invention more specifically.

EXAMPLE 1

Preparation of a titanium catalyst component (a)

Anhydrous magnesium chloride (4.76 g; 50 mmoles), 25 ml of decane and 23.4 ml (150 mmoles) of 2-ethylhexyl alcohol were reacted at 130° C. for 2 hours to form a uniform solution. Phthalic anhydride (1.11 g; 7.5 mmoles) was added to the solution, and the mixture was stirred for 1 hour at 130° C. to dissolve phthalic anhydride uniformly in the solution. The resulting uniform solution was cooled to room temperature, and 200 ml (1.8 moles) of titanium tetrachloride kept at −20° C. was added dropwise over 1 hour. After the addition, the temperature of the mixture was raised to 110° C. over 4 hours. When its temperature reached 110° C., 2.68 ml (12.5 mmoles) of diisobutyl phthalate was added, and the mixture was maintained at this temperature for 2 hours with stirring. After the 2-hour reaction, the solid portion was collected by hot filtration, and suspended in 200 ml of $TiCl_4$. Again, the suspension was reacted at 110° C. for 2 hours. After the reaction, the solid portion was collected by hot filtration, and washed thoroughly with decane and hexane at 110° C. until no free titanium compound was detected from the washings. The titanium catalyst component (a) so prepared was stored as a hexane slurry. A part of it was dried to examine the composition of the catalyst component. The resulting titanium catalyst component (a) contained 3.1% by wight of titanium, 56.0% by weight of chlorine, 17.0% by weight of magnesium and 20.9% by weight of diisobutyl phthalate.

Polymerization

A 200-liter SUS reaction vessel was continuously charged hourly with 70 liters of liquid 1-butene, 30 liters of 4-methyl-1-pentene (4MP for short), 100 mmoles of triethyl aluminum, 10 mmoles of vinyltriethoxysilane and 0.5 mmole, as titanium atom, of the titanium catalyst component (a). The partial hydrogen pressure in the vapor phase was maintained at 1.5 kg/cm², and the polymerization temperature, at 70° C.

The polymer solution was continuously withdrawn so that the amount of the solution in the reaction vessel became 100 liters. A small amount of methanol was added to stop the polymerization, and the unreacted monomers were removed. A butene-1/4MP copolymer was obtained in an amount of 8.5 kg per hour. The results are shown in Table 1.

EXAMPLES 2-5

The procedure of Example 1 was repeated except that the amounts of 1-butene and 4MP charged were changed as indicated in Table 1, and the partial pressure of hydrogen was properly changed. The results are shown in Table 1.

EXAMPLE 6

86 liters of 1-butene and 15 liters of 1-hexene were used hourly, and polymerized in the same way as in Example 1. The results are shown in Table 1.

EXAMPLE 7

85 liters of 1-butene and 15 liters of 1-octene were used per hour, and polymerized in the same way as in Example 1. The results are shown in Table 1.

COMPARATIVE EXAMPLES 1-3

The same polymerization as in Example 1 as carried out except that the amounts of 1-butene and 4MP were changed as shown in Table 1 and the partial pressure of hydrogen was changed properly. The results are shown in Table 1.

COMPARATIVE EXAMPLE 4

A 200-liter reaction vessel was continuously charged hourly with 70 liters of liquid 1-butene, 30 liters of 4MP, 20 mmoles of diethyl aluminum chloride, and 1000 millimoles of titanium trichloride (TAC-131, a product of Toho Titanium Co., Ltd.). The partial pressure of hydrogen in the vapor phase was maintained at 2.5 kg/cm², and the polymerization temperature, at 70° C. The polymer solution was continuously withdrawn so that the amount of the solution in the reaction vessel was 100 liters. Methanol was added in an amount of 10 liters per hour, and the reaction mixture was washed with water to remove the unreacted monomers. A copolymer of 1-butene and 4MP was obtained in an amount of 6.8 kg per hour. The results are shown in Table 1.

COMPARATIVE EXAMPLES 5-7

The same polymerization as in Comparative Example 4 was carried out except that each of the comonomers indicated in Table 1 was used, and 1-butene and the comonomer were changed in the amounts indicated in Table 1, and the partial pressure of hydrogen was properly changed. The results are shown in Table 1.

TABLE 1

| | Comonomer | Proportions of the monomers fed | | Alpha-olefin-content (mole %) | Intrinsic viscosity [η] (dl/g) | DSC melting point [Tm] (°C.) | Crystallinity (%) |
|---|---|---|---|---|---|---|---|
| | | 1-Butene (l/hr) | Alpha-olefin (l/hr) | | | | |
| Example | | | | | | | |
| 1 | 4-Methyl-1-pentene | 70 | 30 | 3.5 | 1.9 | 105 | 46.3 |
| 2 | " | 55 | 45 | 7.0 | 2.3 | 94 | 37.2 |
| 3 | " | 45 | 55 | 11.6 | 1.8 | 87 | 33.6 |
| 4 | " | 40 | 60 | 15.4 | 2.5 | 78 | 30.4 |
| 5 | " | 30 | 70 | 23.9 | 3.1 | 65 | 25.7 |
| 6 | 1-Hexene | 85 | 15 | 10.1 | 2.2 | 89 | 34.0 |
| 7 | 1-Octene | 85 | 15 | 8.8 | 2.4 | 91 | 35.4 |
| Comparative Example | | | | | | | |
| 1 | 4-Methyl-1-pentene | 96 | 4 | 0.3 | 2.8 | 125 | 55.2 |
| 2 | " | 92 | 8 | 0.7 | 3.0 | 123 | 52.6 |
| 3 | " | 10 | 90 | 60.3 | 1.8 | 24 | 2.8 |
| 4 | " | 70 | 30 | 8.4 | 2.5 | 97 | 28.4 |
| 5 | " | 65 | 35 | 13.2 | 2.5 | 91 | 24.3 |
| 6 | 1-Hexene | 85 | 15 | 11.3 | 2.0 | 94 | 26.4 |

TABLE 1-continued

| | | | | | | | | |
|---|---|---|---|---|---|---|---|---|
| 7 | 1-Octene | 85 | 15 | 9.9 | 2.7 | 95 | | 25.6 |

| | $W_1$ | | $W_2$ | | Yield strength (kg/cm$^2$) | Tensile strength (kg/cm$^2$) | Elongation at break (%) | Torsional rigidity (kg/cm$^2$) | Young's modulus (kg/cm$^2$) | Standard deviation (mole %) |
|---|---|---|---|---|---|---|---|---|---|---|
| | (wt %) | 0.02a + 1.0 (wt %) | (wt %) | 5 × [η] (wt %) | | | | | | |
| Example | | | | | | | | | | |
| 1 | 0.4 | 1.1 | 0.8 | 2.3 | 58 | 420 | 650 | 600 | 1400 | 0.5 |
| 2 | 0.4 | 1.1 | 0.7 | 1.8 | 49 | 330 | 800 | 550 | 1300 | 1.0 |
| 3 | 0.5 | 1.2 | 1.0 | 2.5 | 46 | 250 | 1000 | 500 | 1100 | 1.6 |
| 4 | 0.5 | 1.3 | 0.8 | 1.7 | 41 | 220 | 1000 | 450 | 1000 | 2.3 |
| 5 | 0.6 | 1.5 | 0.7 | 1.3 | 36 | 200 | 900 | 400 | 900 | 2.7 |
| 6 | 0.4 | 1.2 | 0.8 | 1.9 | 48 | 270 | 1100 | 450 | 1000 | 1.6 |
| 7 | 0.4 | 1.2 | 0.7 | 1.7 | 50 | 290 | 1000 | 500 | 1100 | 1.4 |
| Comparative Example | | | | | | | | | | |
| 1 | 0.3 | 1.0 | 0.6 | 1.5 | 134 | 510 | 390 | 1400 | 2400 | 0.1 |
| 2 | 0.3 | 1.0 | 0.5 | 1.3 | 126 | 480 | 420 | 1300 | 2300 | 0.1 |
| 3 | 1.1 | 2.2 | 2.0 | 2.5 | 14 | 65 | 1200 | 110 | 240 | 10.3 |
| 4 | 2.4 | 1.2 | 2.2 | 1.7 | 36 | 190 | 800 | 320 | 700 | 4.1 |
| 5 | 2.3 | 1.3 | 2.5 | 1.7 | 24 | 140 | 900 | 280 | 600 | 6.5 |
| 6 | 2.5 | 1.2 | 3.0 | 2.2 | 30 | 160 | 850 | 310 | 650 | 5.5 |
| 7 | 2.2 | 1.2 | 2.3 | 1.5 | 33 | 180 | 800 | 330 | 700 | 4.8 |

APPLICATION EXAMPLES 1-7 AND COMPARATIVE APPLICATION EXAMPLES 1-7

[1] Anti-blocking of a film

Each of the random 1-butene copolymers obtained in the foregoing Examples and Comparative Examples and a polypropylene resin ([η]=2.0 dl/g; ethylene content 2.0 mole %) were melt-mixed in a ratio of 1:3, and the mixture was formed into a 30 micron thick T-die film using an extruder having a screw diameter of 30 mm at a molding temperature of 200° to 250° C. The antiblocking property of the film was evaluated, and the results are shown in Table 2.

[Method of evaluating antiblocking property]

Determined in accordance with ASTM D1893. Two test pieces, each 10 cm wide and 15 cm long, are cut off from the resulting film. The test pieces are superimposed one on top of the other, and held by two glass sheets. A load of 10 kg is placed on the assembly. The assembly is left to stand in an air oven at 50° C. The assembly was taken out 1 day and 7 days later, and its peel strength is measured by a universal tester. The peel strength value per cm is taken as a blocking value.

[2] Transparency of the film

The film was aged in an air oven at 50° C. The haze of the film was measured in accordance with ASTM D1003-611 before aging and 1 and 7 days after the aging.

[3] Slipping property of the film

The film was aged in an air oven at 50° C. The coefficient of static friction and the coefficient of dynamic friction of the film are measured before the aging and 1 day and 7 days after the aging.

TABLE 2

| | Random 1-butene copolymer | Blocking value (g/cm) | | Haze (%) | | | Slipping properties (coefficient of static friction/ coefficient of dynamic friction) | | | | | |
|---|---|---|---|---|---|---|---|---|---|---|---|---|
| | | After 1 day | After 7 days | Before | After 1 day | After 7 days | Before | | After 1 day | | After 7 days | |
| Application Example | Example | | | | | | | | | | | |
| 1 | 1 | 2.9 | 3.9 | 5.1 | 5.9 | 6.2 | 0.27 | 0.25 | 0.22 | 0.20 | 0.28 | 0.27 |
| 2 | 2 | 3.3 | 4.3 | 5.0 | 5.9 | 6.1 | 0.24 | 0.23 | 0.22 | 0.21 | 0.27 | 0.24 |
| 3 | 3 | 3.2 | 4.0 | 4.8 | 5.8 | 6.3 | 0.27 | 0.25 | 0.23 | 0.22 | 0.29 | 0.27 |
| 4 | 4 | 3.4 | 4.2 | 4.2 | 6.0 | 6.5 | 0.30 | 0.28 | 0.23 | 0.22 | 0.35 | 0.31 |
| 5 | 5 | 3.5 | 4.7 | 4.3 | 6.1 | 6.8 | 0.30 | 0.29 | 0.24 | 0.22 | 0.34 | 0.32 |
| 6 | 6 | 3.0 | 4.0 | 4.0 | 5.6 | 6.0 | 0.27 | 0.24 | 0.24 | 0.23 | 0.29 | 0.28 |
| 7 | 7 | 3.1 | 4.2 | 4.1 | 5.8 | 6.2 | 0.26 | 0.25 | 0.24 | 0.23 | 0.28 | 0.26 |
| Comparative Application Example | Comparative Example | | | | | | | | | | | |
| 1 | 1 | 2.7 | 3.7 | 8.5 | 8.9 | 9.0 | 0.24 | 0.23 | 0.21 | 0.20 | 0.25 | 0.23 |
| 2 | 2 | 2.9 | 3.8 | 8.4 | 8.7 | 9.1 | 0.25 | 0.23 | 0.22 | 0.20 | 0.27 | 0.25 |
| 3 | 3 | 4.9 | 10.0 | 4.5 | 6.9 | 8.5 | 0.38 | 0.33 | 0.61 | 0.55 | Measurement impossible | |
| 4 | 4 | 4.3 | 10.1 | 4.4 | 7.5 | 9.0 | 0.31 | 0.27 | 0.78 | 0.68 | | |
| 5 | 5 | 4.8 | 11.8 | 4.2 | 7.6 | 9.5 | 0.30 | 0.28 | 0.80 | 0.69 | | |
| 6 | 6 | 4.0 | 9.9 | 4.3 | 6.8 | 8.3 | 0.29 | 0.27 | 0.75 | 0.67 | | |
| 7 | 7 | 41 | 10.5 | 4.5 | 7.1 | 8.8 | 0.30 | 0.27 | 0.78 | 0.69 | | |

What is claimed is:

1. A random 1-butene copolymer comprising 1-butene and an alpha-olefin selected from the group consisting of 1-pentene, 1-hexene, 4-methyl-1-pentene, 3-methyl-1-pentene, 1-octene, and 1-decene, said copolymer having the following characteristics (A) to (F):
(A) it comprises 50 to 99 mole % of the 1-butene component and 1 to 50 mole % of the alpha-olefin component,
(B) it has an intrinsic viscosity (η), measured in decalin at 135° C., of from 0.5 to 6 dl/g,
(C) it has a melting point (Tm), measured by a differential scanning calorimeter, of from 30° to 120° C.,
(D) it has a crystallinity, measured by X-ray diffractometry, of from 5 to 60%, (E) the amount ($W_1$ in % by weight) of that portion of it which is soluble in boiling methyl acetate is not more than 2%, and (F) the amount ($W_2$ in % by weight) of that portion of it which is soluble in a 1:1 by volume mixture of acetone and n-decane at 10° C. is less than $5 \times (\eta)^{-1.2}$.

2. The random 1-butene copolymer of claim 1 which comprises 60 to 98 mole % of 1-butene and 2 to 40 mole % of the $C_5$–$C_{20}$ alpha-olefin.

3. The random 1-butene copolymer of claim 1 which has a yield strength (G) of 10 to 200 kg/cm².

4. The random 1-butene copolymer of claim 1 which has a tensile strength at break (H) of 100 to 1000 kg/cm².

5. The random 1-butene copolymer of claim 1 which has an elongation at break (I) of at least 300%.

6. The random 1-butene copolymer of claim 1 which has a torsional rigidity (J), measured by the method of JIS K-6745, of 100 to 2000 kg/cm₂.

7. The random 1-butene copolymer of claim 1 which has a Young's modulus (K), measured by the method of JIS K-7113, of 200 to 4000 kg/cm².

8. The random 1-butene copolymer of claim 1 wherein $W_2$ in weight % (F) is $0.1 \times [\eta]^{-1.2}$ to less than $5 \times [\eta]^{-1.2}$.

9. The random 1-butene copolymer of claim 1 wherein $W_2$ in weight % (F) is $0.2 \times [\eta]^{-1.2}$ to $4 \times [\eta]^{-1.2}$.

10. The random 1-butene copolymer of claim 1 wherein $W_2$ in weight % (F) is $0.3 \times [\eta]^{-1.2}$.

11. The random 1-butene copolymer of claim 1 which includes from 2 to 30 mole % of the alpha-olefin component.

12. The random copolymer of claim 1 wherein the alpha-olefin is 4-methyl-1-pentene.

13. The random 1-butene copolymer of claim 1 wherein the alpha-olefin component is 1-hexene.

14. The random 1-butene copolymer of claim 1 wherein the alpha-olefin component is 1-octene.

UNITED STATES PATENT AND TRADEMARK OFFICE
CERTIFICATE OF CORRECTION

PATENT NO. : 4,801,672
DATED : January 31, 1989
INVENTOR(S) : MASAKI KOHYAMA ET AL.

It is certified that error appears in the above-identified patent and that said Letters Patent is hereby corrected as shown below:

On the cover page under Foreign Application Priority Data, "59-238951" should read --59-228951--.

In the Abstract, line 10, "120°0" should read --120°--.

Claim 10, line 2 of the claim, before the period ".", insert --to $3 \times [\eta]^{-1.2}$--.

Signed and Sealed this

Twenty-seventh Day of June, 1989

Attest:

DONALD J. QUIGG

*Attesting Officer*  *Commissioner of Patents and Trademarks*